(12) United States Patent
Tsang et al.

(10) Patent No.: US 8,396,997 B2
(45) Date of Patent: Mar. 12, 2013

(54) SYSTEM AND METHOD FOR SURVEILLANCE

(76) Inventors: Fan Luk Tsang, Hong Kong (HK); King Man Fung, Hong Kong (HK)

( * ) Notice: Subject to any disclaimer, the term of this patent is extended or adjusted under 35 U.S.C. 154(b) by 0 days.

(21) Appl. No.: 13/042,419

(22) Filed: Mar. 7, 2011

(65) Prior Publication Data

US 2012/0198100 A1 Aug. 2, 2012

Related U.S. Application Data

(60) Provisional application No. 61/438,237, filed on Jan. 31, 2011.

(51) Int. Cl.
*G06F 3/00* (2006.01)
(52) U.S. Cl. .................... 710/9; 710/3; 710/8
(58) Field of Classification Search .......... None
See application file for complete search history.

(56) References Cited

U.S. PATENT DOCUMENTS

| | | | | |
|---|---|---|---|---|
| 5,799,085 | A * | 8/1998 | Shona | 713/169 |
| 6,990,352 | B2 * | 1/2006 | Pyhalammi et al. | 455/466 |
| 7,213,766 | B2 * | 5/2007 | Ryan et al. | 235/492 |
| 7,237,134 | B2 * | 6/2007 | Heberlein et al. | 713/340 |
| 7,251,729 | B1 * | 7/2007 | Park | 713/168 |
| 7,251,824 | B2 * | 7/2007 | Edwards et al. | 726/4 |
| 7,508,418 | B2 * | 3/2009 | Renkis | 348/211.2 |
| 7,872,578 | B2 * | 1/2011 | Sher | 340/568.1 |
| 8,006,291 | B2 * | 8/2011 | Headley et al. | 726/7 |
| 2004/0015702 | A1 * | 1/2004 | Mercredi et al. | 713/182 |
| 2004/0123113 | A1 * | 6/2004 | Mathiassen et al. | 713/185 |
| 2005/0022000 | A1 * | 1/2005 | Inomata et al. | 713/200 |
| 2008/0229089 | A1 * | 9/2008 | Assouad et al. | 713/2 |
| 2009/0083763 | A1 * | 3/2009 | Sareen et al. | 719/317 |
| 2009/0138867 | A1 * | 5/2009 | Bambach et al. | 717/171 |
| 2009/0292815 | A1 * | 11/2009 | Gao et al. | 709/229 |

FOREIGN PATENT DOCUMENTS

| | | |
|---|---|---|
| CN | 101051912 A | 10/2007 |
| CN | 101065759 A | 10/2007 |
| CN | 101364870 A | 2/2009 |
| CN | 101388773 A | 3/2009 |
| JP | 2007306239 A | 11/2007 |

* cited by examiner

*Primary Examiner* — Henry Tsai
*Assistant Examiner* — Jing-Yih Shyu
(74) *Attorney, Agent, or Firm* — Eagle IP Limited; Jacqueline C. Lui

(57) ABSTRACT

A plug-and-play surveillance system that can be set up by even computer-illiterates is disclosed herein. The system comprises an external storage device connected to a computing device and a monitoring device. A registration and matching service receives at least one unique identification code from the external storage device and the monitoring device and uses it to establish a unique pairing between the external storage device and the monitoring device. Subsequent communication between them can be directly established without the need of re-registration. The present invention provides a convenient surveillance system without complex setting and configuration. The present invention also provides higher privacy level and flexibility that additional features can be added to the system based on the user's need.

13 Claims, 2 Drawing Sheets

SYSTEM AND METHOD FOR SURVEILLANCE

CROSS-REFERENCE TO RELATED APPLICATION

This application claims benefit under 35 U.S.C. §119(e) of U.S. Provisional Application having Ser. No. 61/438,237 filed on Jan. 31, 2011, which is hereby incorporated by reference herein in its entirety.

FIELD OF INVENTION

This invention relates to a network monitoring system, and in particular a system for surveillance over a data communication network.

BACKGROUND OF INVENTION

Transmitting motion image through a data communication network is useful for domestic and industrial surveillance. However it may be difficult to install surveillance software. Under the Internet environment, for example, the monitoring station and the camera may need to go through various routers and firewalls. The steps of connecting the monitoring station to the IP camera may be complex and tedious, especially when the user is not familiar with how to circumvent firewall blockage. This may induce difficulties to the people without computer skill to use IP cameras, especially for the elderly. Security concern is another problem of the existing technique since personal data may be left on the computer being used.

SUMMARY OF INVENTION

In the light of the foregoing background, it is an object of the present invention to provide a system for surveillance without complex setting and configuration and provide a higher security level.

Accordingly, the present invention, in one aspect, is a plug-and-play surveillance system that can be set up by even computer-illiterates. The system comprises an external storage device connected to a computing device and a monitoring device. The external storage device is capable of exchanging data with a registration and matching service via the computing device through a data communication network. Also, the monitoring device is capable of exchanging data with the registration and matching service via the same data communication network. The registration and matching service receives at least one unique identification code from either the external storage device or the monitoring device and uses it to establish a unique pairing between the external storage device and the monitoring device. The pairing is stored in at least one of the devices so that subsequent communication between them can be directly established using the pairing without the need of re-registration.

In an exemplary embodiment of the present invention, the external storage device is a Universal Serial Bus (USB) storage device with a built-in program which is capable of controlling all setting and configuration of the surveillance system. The USB storage saves all data generated by the surveillance system.

In another exemplary embodiment, the monitoring device is a camera that can capture video and audio and is capable of adding additional features based on user's needs. The additional features can be temperature sensor, motion sensor, humility sensor, alarm and reminder, etc. Two-way interactions between the external storage device and the monitoring device can be achieved by adding suitable features to the monitoring device.

According to another aspect of the present invention, it is a method for surveillance over a data communication network. The method comprises the steps of (a) linking an external storage device via a computing device to a registration and matching service through a data communication network; (b) connecting a monitoring device to said registration and matching service via said data communication network; (c) receiving at least one unique identification code from said external storage device and said monitoring device; (d) establishing a unique pairing between said external storage device and said monitoring device based on said at least one unique identification code; and (e) storing said pairing in at least one of said devices.

There are many advantages in the present invention. First, it is easy to use and no complex setting is needed, even for the people without computer skills. Personal privacy can be protected by the present invention. Moreover, the present invention can be used as an alarm system.

DETAILED DESCRIPTION OF THE PREFERRED EMBODIMENTS

As used herein and in the claims, "comprising" means including the following elements but not excluding others. "Couple" or "connect" refers to electrical coupling or connection either directly or indirectly via one or more electrical means unless otherwise stated.

The embodiments described herein discuss how the inventive ideas are realized in an Internet environment wherein a user uses an external storage device with a built-in program to connect to a monitoring device in a remote location. A person skilled in the art can modify the details to implement the idea in other fields of technology, and would still fall in the scope of the present invention.

Figure 1:
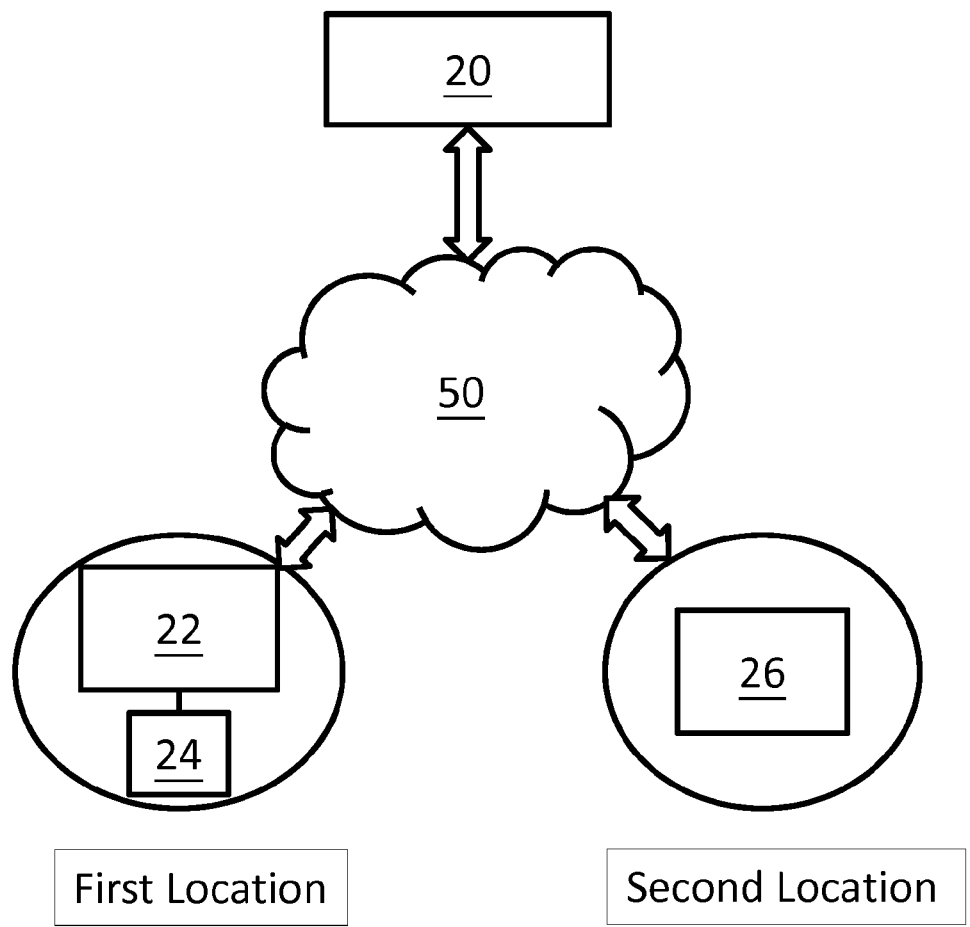
FIG. 1 is an overview of the surveillance system in one embodiment.

Referring now to FIG. 1, the first embodiment of the present invention is shown. FIG. 1 is an overview of the surveillance system. Basically, in this embodiment, there are three components in the surveillance system, which are an external storage device 24 connected to a computing device 22 at the first location, a monitoring device 26 at a second location and a registration and matching service 20. The computing device 22, monitoring device 26 and the registration and matching service 20 are interconnected to each other via the Internet 50 so they can exchange data freely across the network. The computing device 22 and, the monitoring device 26 may pass through one or more routers/firewalls before connecting to the Internet 50. Such routers/firewalls are not shown in the figure for clarity. The external storage device 24 has a built-in program which will be automatically loaded and executed when the user plugs it into the computing device 22. Hence, the user needs not to install any program or software in order to use the surveillance system.

In one embodiment, the registration and matching service 20 can be provided by a server and the server holds a website for registration. In other words, the registration and matching service 20 provides a registration service for the user. Furthermore, the registration and matching service 20 has a software module that provides matching service between the external storage device 24 and the monitoring device 26 (details of the registration and matching operations will be discussed later). After matching, the software module will distribute the IP addresses of the computing device 22 to which the external storage device 24 is connected and the monitoring device 26 to each other so that the external storage device 24 and the monitoring device 26 can directly communicate subsequently.

The monitoring device 26, in an exemplary embodiment, has a unique identification code such as the serial number of the device. The monitoring device 26 also has a built-in program that stores a pre-determined Uniform Resource Locator (URL) directed to web site that provides the registration and matching service 20. In one embodiment, when it is connected to the Internet 50, it obtains an IP address from a DHCP (Dynamic Host Configuration Protocol) server of a router in the Internet 50. And the monitoring device 26 will automatically link and send its unique identification code to the registration and matching service 20 using the pre-determined URL and send its unique identification code to the registration and matching service 20. Therefore it is not needed for a user to set the IP address of the monitoring device 26. This is another advantage of the present invention. Meanwhile, the registration and matching service 20 stores the unique identification code and its IP address in its internal database for subsequent processing.

Figure 2:
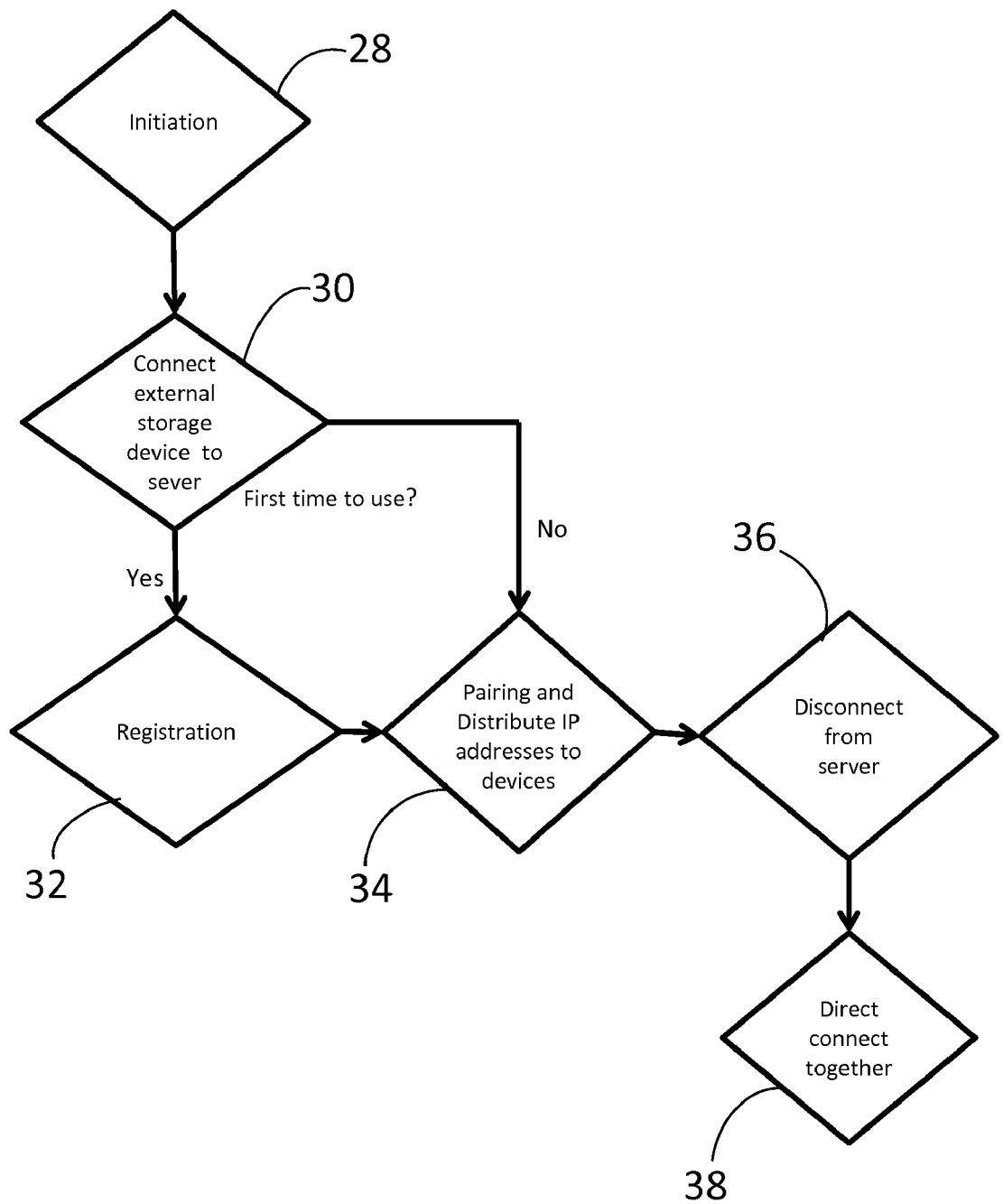
FIG. 2 is a flow chart of the surveillance system when the external storage device is activated in an exemplary embodiment.

Now turning to FIG. 2, it shows a flow chart of the surveillance system in an exemplary embodiment. Step 28 refers to the situation that the monitoring device 26 is set up and is connected to the Internet 50 and the registration and matching service 20 is set up to provide registration and matching service. The surveillance system is said to be initialized and is ready to use. When a user plugs the external storage device 24 into the computing device 22, the built-in program in the external storage device 24 is automatically loaded to the computing device 22 and executed. The built-in program stores the same URL of the registration and matching service 20 and goes through the same process as the monitoring device 26 to automatically connect to the registration and matching service 20 (step 30). Once connected, the registration and matching service 20 stores the IP address of the computing device 22 for subsequent matching operation. In one embodiment, the registration and matching service 20 has a record that stores the visiting history of the external storage device 24. If it is first time the user uses the surveillance system, the user will be automatically directed to step 32 to perform user registration. In another embodiment, the user enters the URL of the website manually so as to access to the website for registration. During first time registration, the user is prompted to input the unique identification code of the monitoring device 26 so that the registration and matching service 20 can perform matching between the computing device 22 to which the external storage device 24 is connected and the monitoring device 26.

In one embodiment, the registration and matching service 20 creates a username and password for the user under registration. The user can choose to save the username and password in the external storage device 24 or not. When the registration is done, step 34 is entered. In one embodiment, the registration and matching service 20 uses the unique identification code of the monitoring device as the key to identify the IP address of the monitoring device. It then creates a new record on a mapping table. In one embodiment, the record comprises the username, unique identification code and the IP address of the monitoring device, and the IP address of the external storage device. Afterwards, step 34 is entered. The registration and matching service 20 will distribute the IP addresses of the computing device 22 to which the external storage device 24 is connected and the monitoring device 26 to each other. In another embodiment, the unique identification code is also sent and stored in the external storage device 24. Afterwards, the computing device 22 to which the external storage device 24 is connected and the monitoring device 26 will be disconnected from the registration and matching service 20 in step 36. Finally in step 38, the computing device 22 to which the external storage device 24 is connected and the monitoring device 26 will automatically establish a unique pairing between them (i.e. direct connection/communication), as they know each other's IP address. The unique pairing, in an exemplary embodiment, is a peer-to-peer connection. It is guaranteed that peer-to-peer connection is always successful if the distributed IP addresses are correct. Thus customer service may not be needed after sale. Once the P2P (peer-to-peer) connection is established, the user can monitor the second location from the first location.

The registration process (step 32) needs to be done only once. Referring to FIG. 2 again, when in another session the user plugs the external storage device 24 into the computing device 22, the latter will execute the build-in program to connect to the registration and matching service 20 (step 30) as before. In one embodiment, the registration and matching service 20 prompts the user to enter a password for verification if the user has not saved his password in the external storage device 24. If the password is saved previously, the verification will be done automatically. The registration and matching service 20 can then use the username to retrieve the unique identification code of the remote device that the external storage device 24 should associate with and perform the same pairing process as described previously in step 34. Afterwards, steps 36 and 38 are executed to establish a new P2P session. The user can insert the external storage device 24 to a second computing device 22 that is different from the first one, and the P2P pairing can still be established—without the need for the user to install program or register again. On the other hand, the monitoring device 26 can also be used in any locations without the need of setting up since the built-in program thereof will automatically initiate connection to the registration and matching service 20. Both the external storage device 24 and the monitoring device 26 are plug-and-play devices that work at any locations.

In yet another embodiment, the external storage device 24 has sufficient space to store all data generated by the surveillance system. The monitoring device 26, in one embodiment, is capable of recording video in the format of H.264 and audio and sending the recorded data to the external storage device for viewing or saving once the unique pairing is established. Since all user data and system data are stored in the external storage device 24, no data will be left in the computing device 22 once the external storage device 24 is removed. This is advantageous as the user may insert the external storage device 24 to any computing device, including those in the public domain, without worrying that some private data is left on that computer. Thus, the security level is higher and personal privacy can be protected in the present invention.

Normally, firewall settings from Internet Service Providers (ISP) allow data packets to go through from user end to a web site server. Subsequent replies from server are allowed too. Since the monitoring device 26 and the computing device 22 initiate data communication to the registration and matching service 20, subsequent data exchange will not be blocked by firewall(s). In some situation, routers from ISP may perform network address translation (NAT). However, the web server still receives an IP address that can uniquely identify the sender. In some cases, a port number is appended to the IP address too.

In one embodiment, additional features can be added to the monitoring device 26 based on the user's needs. For instance, temperature sensor, motion sensor, humility sensor, reminder unit, alarm and speaker, etc, can be added to the monitoring device 26 so that two-way interaction/communication can be achieved between the first location and the second location. Therefore, the present invention is not limited to be a surveillance system but also an interaction/communication system based on the user's need and intention.

In another embodiment, the external storage device 24 is a programmable device so that additional functions can be included based on the user's requirement. The built-in program in the external storage device 24 can control all the settings and configurations within the surveillance system.

In yet another embodiment, the built-in program in the external storage device 24 can monitor several monitoring devices at different locations simultaneously. In addition to one to one IP mapping, the present invention is capable of one to many IP mappings if the network bandwidth is large enough. And any combination of the functions and features mentioned above is feasible by incorporating them to the built-in program. The user can monitor a first location, interact with a second location and communicate with a third location, etc, simultaneously.

In an exemplary embodiment, the present invention is used as a baby monitoring system. The parents install the monitoring device 26 in a baby room and then they can monitor their baby at any location such as a Café as long as there is a computing device connected a suitable data communication network. Other devices can also be installed at the monitoring device side, for example speaker, so that the parents can talk with their baby.

In another exemplary embodiment, the present invention is used as an elderly monitoring and alarm system. The family members can monitor and check the health conditions of the elderly, e.g. temperature, humility by adding preferred features to the monitoring device 26. Meanwhile, the present invention can act as an alarm system. For instance, if the system detects that the temperature is below a certain limit, a reminder will be sent to pagers, or mobile phones of the family members so that they can attend to the need of the elderly. Motion detector can also be added to warn the family members if there is no movement detected within a long period of time. Reminder unit can be provided as well to reminder the elderly to do certain things such as taking medicine. Safety alarm is another useful function that can be included in the system. The user can input several emergency contact numbers (phone number of family members, emergency hotline, etc) so that warning message will be sent when the elderly initiate the alarm system.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, the external storage device 24 can be any type of electrical devices which are capable of storing information on a non-volatile memory such as USB storage, portable hard disk, memory card (e.g. SD/MS) or Solid State Drive (SSD) with built-in programs, etc. Also, the monitoring device can be a camera, image sensor, audio microphone, motion sensor etc, or a combination thereof.

Moreover, the aforesaid embodiments only use one unique identification code in the monitoring device 26 for registration. It is also feasible to use an external storage device with one unique identification code but a camera with no identification code with some programming changes on both devices. In addition, using the unique identification codes of both the external storage device 24 and the monitoring device 26 for registration is another feasible approach that is less complex. Furthermore, the video format needs not to be H.264 only as mentioned in one embodiment. Other formats like AVI, RMVB, FLV, etc, are also workable. The formats of the captured image can be JPEG, BMP, TIF, etc and the formats of the audio can be MP3, WAV, AAC, etc.

The aforesaid embodiments disclose the scenario that a user first connects the monitoring device 26 to the Internet 50, and then inserts the external storage device 24 to the computing device 22. This sequence is not essential. Those skilled in the art, based on the teaching of this invention, can develop variants of aforesaid operational procedures to establish the P2P pairing with one-time registration only. As an example, the role of the monitoring device 26 and the external storage device 24 may be reversed. Moreover, the external storage device 24 may store the unique identification code of the monitoring device in its memory after the first registration and send it to the registration and matching service 20 for matching when it is required to re-establish the P2P connection in a different session. In this scenario, there is no need for the user to enter his username to the web site in order to re-establish P2P connection.

In another variation implementation, the external storage device 24 and computing device 22 may be combined as a single device, such as a desk-top computer, a mobile phone or a data tablet that are capable of connecting to a suitable data communication network.

While Internet 50 is used throughout various embodiments to illustrate the inventive ideas, the present invention can also be realized in any other data communication network with similar capability. Those skilled in the art can adapt the invention ideas disclosed here to many other types of wired or wireless network and it will still be within the scope of this invention.

What is claimed is:

1. A system for surveillance comprising:
   a) an external storage device connected to a computing device; said external storage device being capable of exchanging data with a registration and matching service via said computing device through a data communication network; and
   b) a monitoring device; said monitoring device being capable of exchanging data with said registration and matching service via said data communication network;
   wherein said registration and matching service receives at least one unique identification code from said external storage device and said monitoring device and uses it to establish a unique pairing between said external storage device and said monitoring device; said unique pairing being stored in at least one of said external storage device and said monitoring device so that subsequent data exchange between them can be directly established using said unique pairing without the need of re-registration;
   wherein said data communication network is Internet, said registration and matching service is hosted by a web server with a unique URL and said external storage device further comprises a built-in program; said built-in program is loaded and executed when said external storage device is connected to said computing device, causing said computing device to connect to said URL;
   wherein said at least one unique identification code is selected from a group consisting of (a) said external storage device, (b) said monitoring device and (c) a combination thereof and said at least one unique identification code is sent by the respective device to said web server that hosts said registration and matching service;
   wherein said registration and monitoring service further comprises a software module that receives an IP addresses of said external storage device and said monitoring device, and prompts a user to enter said at least one unique identification code of said external storage device and said monitoring device; said software module further uses said at least one unique identification code to establish the unique pairing between said IP addresses of said external storage device and said IP address of said monitoring device;

wherein once said unique pairing is established, said registration and matching service performs one of the actions selected from:
I. sending said IP address of said monitoring device to said external storage device;
II. sending said IP address of said computing device to said monitoring device; and
III. a combination thereof;

so that said external storage device establishes direct communication with said monitoring device for subsequent data exchange.

2. The system according to claim 1 wherein said software module records a registration history of said external storage device and said monitoring device so that when said external storage device connects to a second computing device, said software module uses said registration history to establish said unique pairing between said external storage device and said monitoring device.

3. The system according to claim 1 wherein said external storage device is selected from a group consisting of
I. a USB storage device;
II. a memory card;
III. a portable hard disk; and
IV. a solid state drive.

4. The system according to claim 1 wherein said monitoring device is selected from a group consisting of
I. a video camera;
II. an audio unit capable of outputting and inputting audio signal;
III. a motion detector;
IV. a temperature sensor;
V. an alarm unit;
VI. a reminder unit;
VII. a humility sensor; and
VIII. any combination thereof.

5. The system according to claim 4, wherein said monitoring device is capable of two-way interaction.

6. The system according to claim 1, wherein said built-in program is capable of controlling all settings and configurations within said system.

7. The system according to claim 1, wherein said external storage device saves all data generated by said system.

8. The system according to claim 1, wherein said monitoring device is capable of adding additional features based on the user's need.

9. The system according to claim 1, wherein said unique identification code is the serial number of said monitoring device.

10. A method for surveillance comprising the steps of:
a) linking an external storage device via a computing device to a registration and matching service through a data communication network;
b) connecting a monitoring device to said registration and matching service via said data communication network;
c) receiving at least one unique identification code from said external storage device and said monitoring device;
d) establishing a unique pairing between said external storage device and said monitoring device based on said at least one unique identification code; and
e) storing said unique pairing in at least one of said external storage device and said monitoring device so that subsequent communication between said external storage device and said monitoring device can be directly established using said unique pairing without the need of re-registration;

wherein said data communication network is Internet, said registration and matching service is hosted by a web server, and said receiving step further comprises the steps of:
I. receiving at least a first unique identification code sent by said external storage device and said monitoring device;
II. prompting a user to enter at least a second unique identification code;

wherein said establishing step further comprises the steps of:
I. identifying a match between said first unique identification code and said second unique identification code; and
II. pairing of the IP address of said monitoring device to the IP address of said computing device when said match is found:

wherein said pairing step further comprises performing one of actions selected from:
I. sending said IP address of said monitoring device to said external storage device;
II. sending said IP address of said computing device to said monitoring device; and
III. a combination thereof;

so that said external storage device establishes direct communication with said monitoring device for subsequent data exchange.

11. The method according to claim 10 further comprising the steps of
I. storing said at least the first unique identification code in an internal database when said pairing is first established in said establishing step;
II. re-constructing said pairing of IP address when said external storage device is connected to a second computing device by performing the steps of
(i) identifying a match between said first unique identification code and said second unique identification code; and
(ii) pairing of the IP address of said monitoring device to the IP address of said computing device when said match is found when said second unique identification code is provided.

12. The method according to claim 10 further comprises saving all data in said external storage device.

13. The method according to claim 10 further comprises adding additional features to said monitoring device based on the user's need; said additional features is selected from a group consists of:
I. sensing the temperature of an entity by a temperature sensor;
II. detecting movement by a motion detector;
III. receiving and outputting audio signal;
IV. generating alarms and reminders; and
V. any combination thereof.

* * * * *